Patented Dec. 4, 1923.

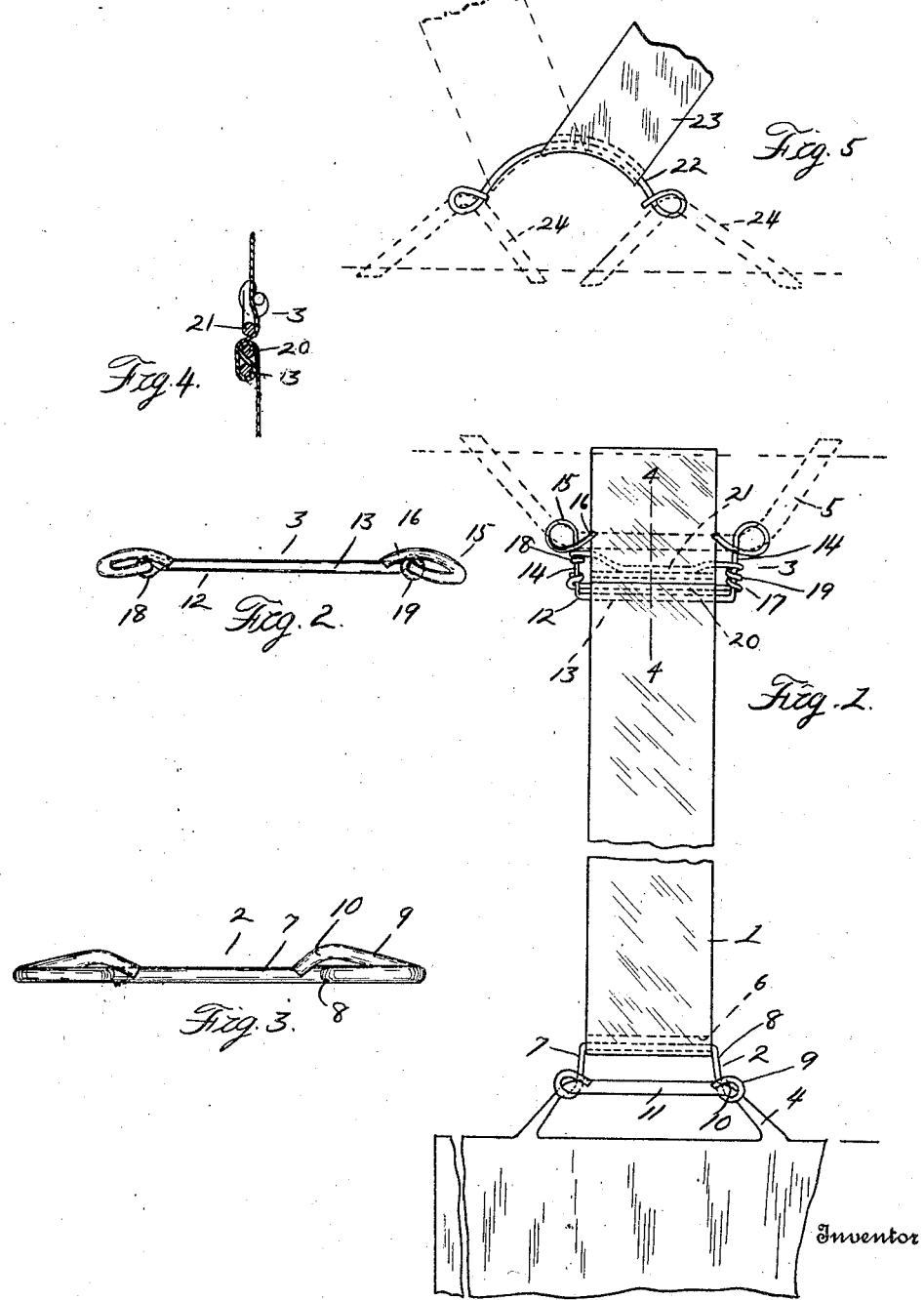

1,476,193

UNITED STATES PATENT OFFICE.

BIRDORA H. WHITE, OF DETROIT, MICHIGAN.

FASTENER.

Application filed August 27, 1920. Serial No. 406,328.

*To all whom it may concern:*

Be it known that I, BIRDORA H. WHITE, a citizen of the United States of America, residing at Detroit, in the county of Wayne and State of Michigan, have invented certain new and useful Improvements in Fasteners, of which the following is a specification, reference being had therein to the accompanying drawings.

The invention relates to fasteners and is particularly adapted for use in supporting wearing apparel, such as overalls, stockings, etc. One of the objects of the invention is to provide a simple construction which is comparatively cheap to manufacture and may be readily applied or detached and which at the same time will prevent accidental disengagement of the article being supported. With these objects in view the invention resides in the novel arrangements and combinations of parts as more fully hereinafter set forth.

In the drawings:

Figure 1 is a side elevation of a construction embodying my invention;

Figures 2 and 3 are end elevations of the fasteners;

Figure 4 is a cross-section on the line 4—4 of Figure 1;

Figure 5 is a side elevation of a modified construction of fastener.

In the present instance the fasteners are shown upon a garter for supporting a stocking from a child's waist. 1 is an elastic strip, and 2 and 3 are fasteners at opposite ends of this strip, the fastener 2 being adapted to engage the loop 4 upon the stocking and the fastener 3 being adapted to engage the loop 5 upon a child's waist.

The fastener 2 is firmly secured to the lower end of the elastic strip 1 as by the stitching 6 and comprises the U-shaped portion 7, the base of which extends through the hem of the elastic strip and the legs 8 extending substantially parallel to each other. 9 are loops at the ends of the legs and located at the outer sides thereof, the end portions 10 of these loops extending transversely of the legs and curved therearound to terminate in substantially the plane of the U-shaped portion. These end portions extend adjacent to the legs and the space therebetween is slightly less than the thickness of the loop 4 upon the stocking, so that in engaging the loop 4 with the loops 9 the end portions 10 are yieldably bent away from the legs 8, after which they will return to their normal positions and firmly hold the loop 4 in engagement. To more securely hold the loop 4 in engagement the end portions 10 are bent downwardly or outwardly with respect to the base of the U-shaped portion, so that the portion 11 of the loop 4 extends over the end portions 10.

The fastener 3 is secured to the elastic strip 1 to be adjustable thereon and as shown comprises the U-shaped portion 12 having the base 13 and the substantially parallel legs 14. There are loops 15 at the ends of these legs and located at their outer sides, which loops have the end portions 16 terminating in substantially the plane of the U-shaped portion and bent partially around the legs 14 in the same manner as the end portions of the loops 9 of the fastener 2.

For adjustably securing the fastener 3 to the elastic strip 1 there is a resilient member 17, the ends 18 of which are coiled around one leg 14 of the U-shaped member 12 and the middle 19 of which is coiled around the other leg 14 of the U-shaped member. These coils slidably engage the legs to permit of freely passing the elastic strip between the legs 20 and 21 of the resilient member and the base 13 of the U-shaped portion. As shown particularly in Figure 4, the elastic strip extending from the fastener 2 first passes around the leg 20 and between this leg and the base 13 and then passes between the leg 20 and the leg 21, which latter leg is preferably curved to engage that portion of the elastic strip between the legs 20 and 21 and hold the fastener 3 in its adjusted position upon the elastic strip. Thus it is seen that due to the resiliency of the member 17, the elastic strip may be readily engaged with the fastener and when engaged will be resiliently held in place.

In the modification shown in Figure 5 the fastener 22 is of the same general arrangement as the fastener 2 with the exception that the U-shaped portion thereof is circular and will allow of the elastic strip 23 assuming various positions dependent upon the movement of the body of the wearer. Furthermore, as shown in this figure, a pair of securing loops 24 is used upon the stocking, each of which passes through a loop of the fastener.

Although the fastener 2 has been described as attachable to the stocking and the fastener 3 to the child's waist, it is obvious that they may be reversed and in fact it is desirable in many instances to do so.

What I claim as my invention is:

1. A fastener comprising a member adapted to be connected to an article of wearing apparel and having portions at the ends thereof bent outwardly thence upwardly and inwardly to provide loops, the inwardly extending portions of said loops extending transversely of the sides of said member and being curved partly therearound in spaced relation thereto.

2. The combination with an article of wearing apparel having a loop, of a fastener detachably secured to said loop, said fastener having a single loop at each end adapted to engage said strip loop, the loops of said fastener having end portions extending transversely of the sides of said fastener and bent inwardly to partially surround the same.

In testimony whereof I affix my signature.

BIRDORA H. WHITE.